United States Patent
Macaluso

(10) Patent No.: US 9,077,798 B2
(45) Date of Patent: Jul. 7, 2015

(54) AUTOMATIC PROVISIONING OF ABBREVIATED DIALING CODES

(75) Inventor: Anthony G. Macaluso, Rancho Santa Fe, CA (US)

(73) Assignee: SITO Mobile R&D IP, LLC, Jersey City, NJ (US)

(*) Notice: Subject to any disclaimer, the term of this patent is extended or adjusted under 35 U.S.C. 154(b) by 1339 days.

(21) Appl. No.: 12/034,518

(22) Filed: Feb. 20, 2008

(65) Prior Publication Data

US 2008/0232572 A1    Sep. 25, 2008

Related U.S. Application Data

(60) Provisional application No. 60/890,821, filed on Feb. 20, 2007.

(51) Int. Cl.
*H04M 3/42* (2006.01)
*H04M 3/493* (2006.01)
*H04Q 3/00* (2006.01)

(52) U.S. Cl.
CPC ........ *H04M 3/42144* (2013.01); *H04M 3/4935* (2013.01); *H04M 2203/154* (2013.01); *H04Q 3/005* (2013.01); *H04Q 2213/13098* (2013.01); *H04Q 2213/13103* (2013.01); *H04Q 2213/13176* (2013.01); *H04Q 2213/13331* (2013.01); *H04Q 2213/13377* (2013.01)

(58) Field of Classification Search
CPC ..................... H04M 2203/154; H04M 3/4935; H04M 3/154
USPC .......................................................... 379/216
See application file for complete search history.

(56) References Cited

U.S. PATENT DOCUMENTS

| | | | |
|---|---|---|---|
| 3,600,522 A | 8/1971 | Benson | |
| 3,975,595 A | 8/1976 | Berube et al. | |
| 4,600,812 A | 7/1986 | Gerlits | |
| 5,131,020 A | 7/1992 | Liebesny et al. | |
| 5,214,793 A | 5/1993 | Conway et al. | |
| 5,216,703 A | 6/1993 | Roy | |

(Continued)

FOREIGN PATENT DOCUMENTS

| | | |
|---|---|---|
| KR | 10-2001-0103670 | 11/2001 |
| KR | 10-2003-0047364 | 6/2003 |

(Continued)

OTHER PUBLICATIONS

International Searching Authority: Notification of Transmittal of the International Search Report and the Written Opinion of the International Searching Authority for International Application No. PCT/US2008/054439 (10 pages), mailed Jun. 30, 2008.

*Primary Examiner* — Amal Zenati
(74) *Attorney, Agent, or Firm* — Polsinelli PC

(57) ABSTRACT

A system, method and a computer program product for automatically provisioning an abbreviated dialing code are disclosed. The system includes a provisioning manager designed to process a request to provision an abbreviated dialing code. The provisioning manager includes a provisioning server that receives the request and a database of rules, communicatively coupled to the provisioning server, that stores one or more rules associated with the abbreviated dialing code. The system also includes a registry manager, communicatively coupled to the provisioning manager, that determines whether an abbreviated dialing code is registered.

40 Claims, 6 Drawing Sheets

(56) References Cited

U.S. PATENT DOCUMENTS

| | | |
|---|---|---|
| 5,282,238 A | 1/1994 | Berland |
| 5,307,400 A | 4/1994 | Sawyer et al. |
| 5,365,582 A | 11/1994 | Yamada et al. |
| 5,418,844 A | 5/1995 | Morrisey et al. |
| 5,422,656 A | 6/1995 | Allard et al. |
| 5,524,146 A | 6/1996 | Morrisey et al. |
| 5,583,926 A | 12/1996 | Venier et al. |
| 5,594,779 A | 1/1997 | Goodman |
| 5,604,682 A | 2/1997 | McLaughlin et al. |
| 5,752,186 A | 5/1998 | Malackowski et al. |
| 5,758,286 A | 5/1998 | Leppanen |
| 5,768,358 A | 6/1998 | Venier et al. |
| 5,778,313 A | 7/1998 | Fougnies |
| 5,867,780 A | 2/1999 | Malackowski et al. |
| 5,898,917 A | 4/1999 | Batni et al. |
| 6,154,648 A | 11/2000 | Comer |
| 6,246,757 B1 * | 6/2001 | Cai et al. ............... 379/114.2 |
| 6,397,057 B1 | 5/2002 | Malackowski et al. |
| 6,411,803 B1 | 6/2002 | Malackowski et al. |
| 6,839,556 B2 | 1/2005 | Malackowski et al. |
| 6,990,472 B2 | 1/2006 | Rosenhaft et al. |
| 7,181,200 B2 | 2/2007 | Malackowski et al. |
| 7,257,391 B2 | 8/2007 | Burgess et al. |
| 7,289,522 B2 * | 10/2007 | Gallant ............... 370/401 |
| 7,813,716 B2 | 10/2010 | Malackowski et al. |
| 7,865,447 B2 | 1/2011 | Rosenhaft et al. |
| 8,041,341 B1 | 10/2011 | Malackowski et al. |
| 2003/0099342 A1 * | 5/2003 | Tiliks et al. ............ 379/216.01 |
| 2004/0005874 A1 | 1/2004 | Malackowski et al. |
| 2004/0174983 A1 * | 9/2004 | Olschwang et al. ......... 379/377 |
| 2009/0170562 A1 * | 7/2009 | Kujala et al. ............. 455/564 |

FOREIGN PATENT DOCUMENTS

| | | |
|---|---|---|
| WO | WO 97/37502 | 10/1997 |
| WO | WO 03/047232 | 6/2003 |

* cited by examiner

AUTOMATIC PROVISIONING OF ABBREVIATED DIALING CODES

CLAIM OF PRIORITY

This application claims priority under 35 USC §119(e) to U.S. Patent Application Ser. No. 60/890,821, filed on Feb. 20, 2007, the entire contents of which are hereby incorporated by reference.

TECHNICAL FIELD

The subject matter described herein relates to techniques for automatically provisioning abbreviated dialing codes that can function as distribution channels for providing content, products and services to end users.

BACKGROUND

A telephone number is a dialing code consisting of a sequence of decimal digits that indicate the intended endpoint or destination for a telephone call initiated by dialing the dialing code. Depending on the country, the total number of decimal digits for each phone number can vary. For example, in the United States, each telephone number consists of ten digits (a three digit area code followed by a seven digit sequence.) When dialing a phone number having the same area code, a caller can dial only the seven digit sequence. However, when dialing a phone number with a different area code, all ten digits are dialed, preceded by the number, "1." In general, the sequence of numeral digits for each telephone number may be difficult to remember due to its length and seemingly random nature.

SUMMARY

Techniques for automatically provisioning an abbreviated dialing code, that is easy to remember, to an intended destination (e.g., a particular telephone number) are disclosed.

In a first aspect, a system for automatically provisioning an abbreviated dialing code includes a provisioning manager designed to process a request to provision an abbreviated dialing code. The provisioning manager includes a provisioning server that receives the request and a database of rules, communicatively coupled to the provisioning server, that stores one or more rules associated with the abbreviated dialing code. The system also includes a registry manager, communicatively coupled to the provisioning manager, that determines whether an abbreviated dialing code is registered.

Implementations can optionally include one or more of the following features. The provisioning server can be further designed to generate the abbreviated dialing code to include a combination of one or more symbols and one or more numbers when the registry manager determines that the abbreviated dialing code is not registered. Also, the registry manager can be further designed to register the abbreviated dialing code when the registry manager determines that the abbreviated dialing code is not registered. When the provisioning server generates the abbreviated dialing code to include one or more numbers and one or more symbols, the abbreviated dialing code can include a code that begins with a # or a * symbol.

Implementations can further optionally include one or more of the following features. The provisioning server can be designed to instruct a communication network provider to route a telephone call initiated by dialing the abbreviated dialing code on a communication device to a destination based on the one or more rules associated with the abbreviated dialing code. Further, the provisioning server can be designed to instruct the communication network over a wireless voice network. Alternatively, the provisioning server can be designed to instruct the communication network over a wired voice network. The destination for routing the telephone call based on the one or more rules associated with the abbreviated dialing code can include a telephone number. The communication device can include a mobile device and the destination can include an internet protocol address. Alternatively, the destination can include content delivered to the communication device. The content can also include video data. Alternatively, the content can include a ringtone. Further, the destination can include a service.

In another aspect, a system for automatically provisioning an ADC includes a provisioning manager designed to receive a request to modify a previously provisioned abbreviated dialing code. The system further includes a registration manager designed to determine whether the abbreviated dialing code has been registered. When the registration manager determines that the abbreviated dialing code is registered, the provisioning manager accesses a rule associated with the abbreviated dialing code. The accessed rule indicates a destination for routing a telephone call initiated by dialing the abbreviated dialing. In addition, the provisioning manager modifies the accessed rule associated with the abbreviated dialing code to change the destination. The provisioning manager is further designed to instruct a communication network provider to route the telephone call initiated by dialing the abbreviated dialing code to the changed destination based on the modified rule.

Computer program products, tangibly embodied in a computer or machine readable medium are also described. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

Further, features described in this specification can be implemented as one or more methods or processes.

The subject matter described herein provides many advantages. For example, the subject matter described herein may be simultaneously used in connection with different wireless carriers (Verizon, Cingular, etc), different transport technologies (CDMA, GMS, GPRS, EdVO, etc.), different mobile devices (Sony Ericsson, Samsung, Nokia, etc.), and/or software execution platforms (Java, Brew). In addition, automatic provisioning an abbreviated dialing code may virtually eliminate the delay associated with manual provisioning. Further, an automatically provisioned abbreviated dialing code can be modified in real-time (i.e., in a dynamic fashion.)

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
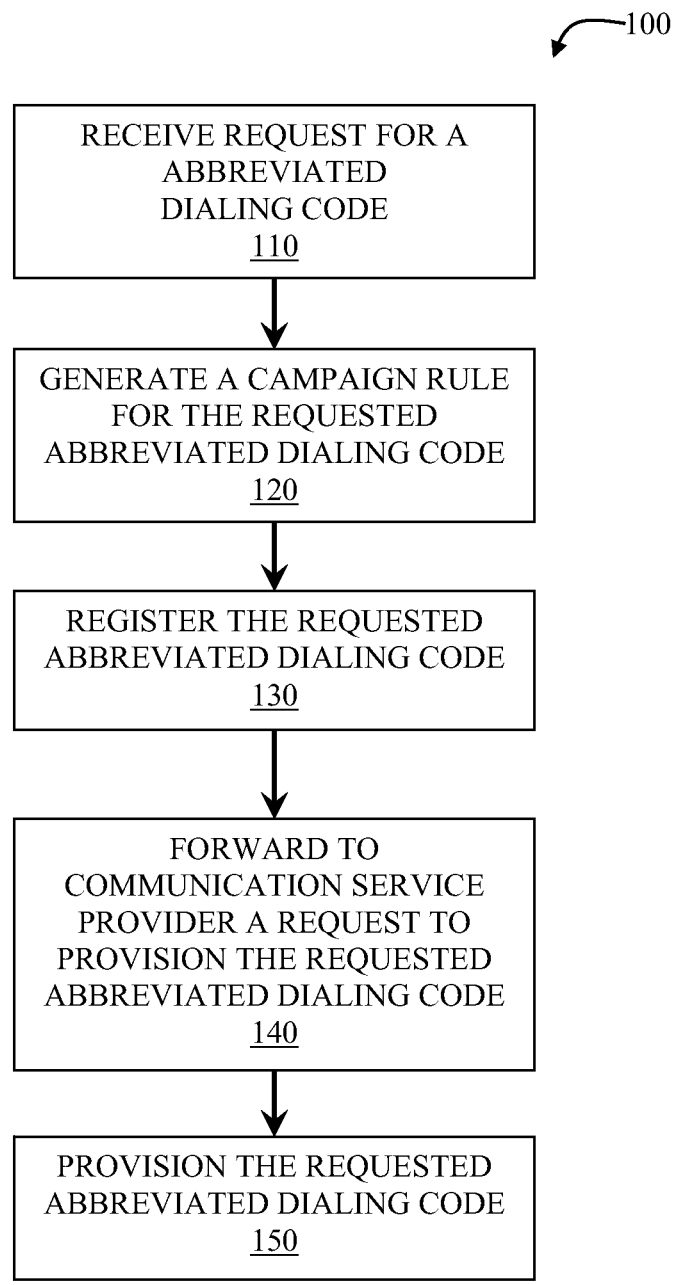
FIG. 1 is a process flow diagram illustrating a process for generating and provisioning an abbreviated dialing code.

Techniques for automatically provisioning an abbreviated dialing code are disclosed. An abbreviated dialing code (ADC) is a shortened dialing code consisting of a sequence of symbols and decimal digits that are easy to remember. The sequence of symbols and decimal digits begins with one or more of the pound (#) symbol, the asterisk symbol (*) or a combination of both (e.g., #, ##, *, **, #*, *#, etc.) An abbreviated dialing code can be provisioned to any desired destination including a normal telephone number, a service, a product, content, an internet protocol (IP) address, etc.

For example, #CHEVY (#24389) can be provisioned to a normal telephone phone number for a local Chevrolet dealer. Alternatively, #CHEVY can be provisioned to an interactive voice response (IVR) that provides a listing of all local Chevrolet dealers. An IVR is a computerized telephone system that allows a telephone caller to interact with the computerized telephone system. By providing a voice menu, the telephone caller can interact with the computerized telephone system to obtain the desired information, service, etc.

In some implementations, a user may hear a disc jockey on a radio broadcast call out after a song is played: "to download Don't Phunk With My Heart dial #147 on your Cingular phone now." Thereafter, the listener dials #147 on their mobile phone and an optimized ringtone is delivered to the customer. In other variations, a user may hear or see a TV commercial or billboard stating: "Dial #STS (#287) on your phone and get more information on the new Cadillac STS." With such variations, the #STS system automatically identifies information associated with the caller and/or his/her mobile phone such as the caller's name, address, and phone number and delivers some or all of the information electronically to Cadillac in exchange for a fee. The consumer has opted in to provide his information in exchange for the Cadillac information and looks forward to receiving the Cadillac information via mail, e-mail, text message, a short messaging system (SMS) message, etc.

In other implementations, an abbreviated dialing code can be provisioned to an automated system for submitting information that can be used for various purposes. For example, #VISA (#8472) can be provisioned to an automated system for submitting an application for a credit card. A user sees an advertisement (e.g., while watching television, listening to radio or reading a newspaper or a magazine) urging him/her to dial #VISA to automatically apply for a VISA credit card. Similar to #STS system above, the #VISA system automatically identifies the customer information (e.g., the callers name, address, and phone number) and delivers some or all of identified customer information electronically to VISA. In addition to automatically identifying and submitting customer information, a credit report of the user (or customer) can be obtained automatically with consent of the user. For example, a SMS message is sent to the mobile communications device including a pointer to a destination (e.g., a web site) that requests and obtains permission to access the user's credit report). This pointer, when activated (and/or when data associated with the pointer is sought) by the mobile communications device, causes one or more operational parameters associated with the mobile communications device to be determined so that data associated with the credit application can be transmitted to the mobile communications device in a format compatible with the determined one or more operational parameters. An ADC can be provisioned to other automated application processes including applying for a driver's license (or a renewal), registering a vehicle, registering on a website, etc.

In other implementations, a user can dial #GOOGLE® (#466453) to automatically reach Google's website. The #GOOGLE® ADC eliminates the need for the user to launch a web browser on his/her mobile device, enter an appropriate IP address and navigate to the website. Other websites can be provisioned as the destination for an ADC to directly access the websites (i.e., any IP address.) In similar fashion, an ADC can be provisioned to directly access live video content (e.g., streaming media) such as a live news report from a news website. For example, #CNN® or #FOXNEWS® can be provisioned to send a real-time video content of the live news program directly to the mobile device. In some implementations, a SMS message is sent to the mobile communications device including a pointer to a destination (e.g., an IP address of the video content) that when selected by the user, streams the video content to the mobile communication device.

In yet other implementations, an ADC can be provisioned to submit information for other purposes. For example, an ADC can be implemented to allow viewers of a reality television show to cast their votes according to the rules of the show.

Typically, provisioning an abbreviated dialing code can be a lengthy process that involves hardwiring of telephone switching mechanisms that cannot easily be modified. FIG. 1 illustrates a process 100 for generating and provisioning an ADC. At 110, a request to generate and provision an ADC is received. The received request is processed at 120 to generate a campaign rule or set of rules that details the process of associating the requested ADC with the desired destination. For example, a campaign rule or set of rules for the above described #CHEVY can include the following: (1) when a telephone call initiated by dialing #CHEVY is received, identify the location of the user (e.g., by identifying the cell tower that routed the call); (2) identify the normal dialing code (e.g., 1-555-555-5555) for the IVR that provides a list of Chevrolet dealers near the location of the user; and (3) route the telephone call initiated by dialing #CHEVY to the destination telephone number.

At 130, the requested dialing code is registered with a registry that manages all ADC if the requested ADC is identifies as not registered. If the ADC is already registered, a determination is made to decide whether a campaign rule or set of rules already exists for the ADC. When a campaign rule or set of rules already exists, a determination is made to decide whether the preexisting campaign rule or set of rules are different from the requested new campaign rule or set of rules. If the pre-existing campaign rule or set of rules are different from the newly generated campaign rule or set or rules, the pre-existing campaign rule or rules are overridden or updated with the new campaign rule or set of rules. Alternatively, the requested ADC can be forwarded to a registry manager to determine whether the ADC has been registered before generating a campaign rule or set of rules.

At 140, a request to provision the ADC according to the generated campaign rule or set of rules is forwarded to a communication service provider (e.g., a wireless service provider such as Verizon® wireless.) The received request to provision the ADC is executed by the communication service provider at 150. Typically, provisioning an ADC involves manually setting (e.g., hardwiring) one or more telephone switching mechanisms to the desired destination (e.g., a regular ten digit telephone number.) For example, a technician is sent out to the field to manually hardwire the appropriate telephone switching mechanisms to the desired destination telephone number. Such manual provisioning is time consuming and thus cannot be accomplished in real time or dynamically. In addition, once hardwired, changes in the campaign rules cannot be updated in real-time. Automatically provisioning an ADC according to the present specification allows for real-time provisioning with dynamic changes or updates.

Figure 2:
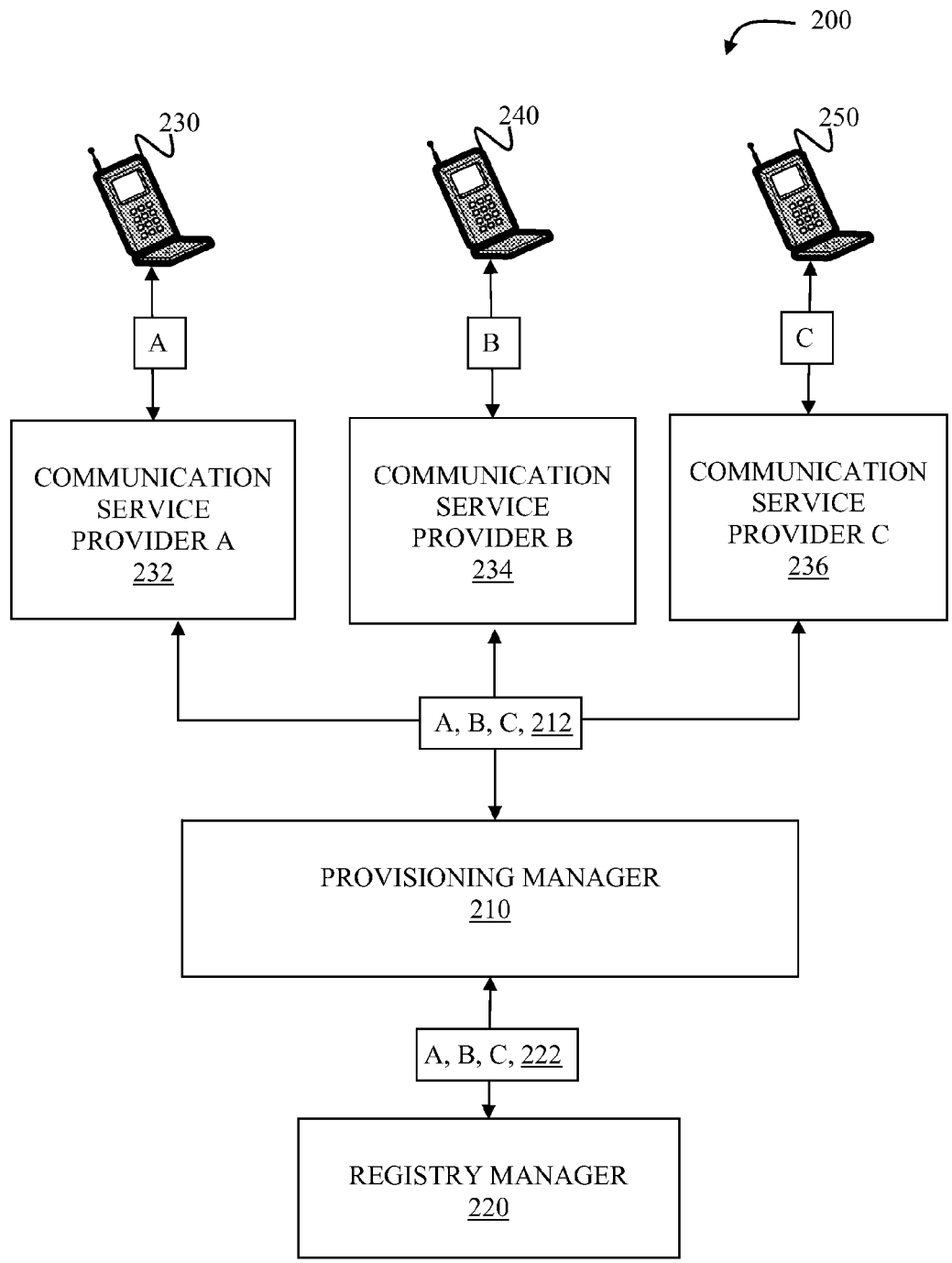
FIG. 2 is a block diagram illustrating a high level view of a system for automatically provisioning an abbreviated dialing codes.

FIG. 2 illustrates a high level overview of a system 200 for automatically provisioning one or more abbreviated dialing codes. The system 200 includes a provisioning manager 210 designed to received telephone calls (voice and/or data signals) from one or more communication devices 230, 240 and 250. Each of the communication devices 230, 240 and 250 may be associated with different communication service providers (e.g., wireless service provider, such as Verizon, Cingular, Sprint, etc.) 232, 234 236, and each communication service provider may operate under different communication transport technologies (e.g., wireless communication technologies, such as CDMA, GMS, GPRS, EdVO, etc.) In some implementations, the communication service providers can include traditional wired land-line communication service providers (e.g., AT&T, Verizon, Sprint, etc.) When users (not shown) dial abbreviated dialing codes (A), (B) and (C) to initiate telephone calls, the abbreviated dialing codes (A), (B), (C) and other information associated with the communication devices 230, 240 and 250 are routed to the provisioning manger 210 through an appropriate communication network 212 (e.g., communication network associated with the service provider.) The provisioning manager 210 communicates with a registry manger for 220 through an appropriate communication link 220 to verify registration of the received abbreviated dialing codes (A), (B), (C) or to register them if necessary.

Figure 3:
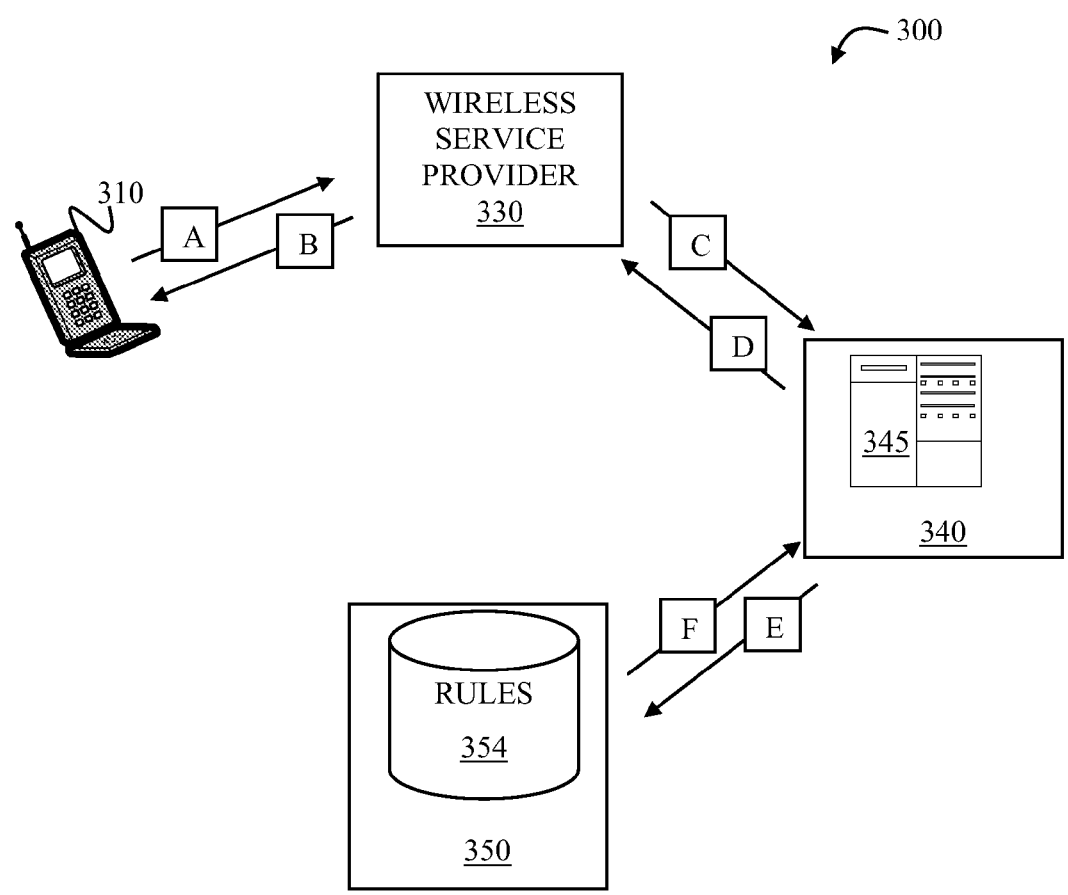
FIG. 3 is a functional block diagram illustrating a system for automatically provisioning an abbreviated dialing codes in a communication network.

FIG. 3 illustrates a system 300 for automatically provisioning an abbreviated dialing code dialed from a communication device 310 operating though a wireless service provider 330. When a user initiates a telephone call by dialing an abbreviated dialing code, a telephone signal (A) associated with the abbreviated dialing code is received by the wireless service provider 330 and processed using signal system #7 (SS7), a set of telephony signaling protocols. SS7 provides a universal structure for telephone network signaling, messaging, interfacing, etc. SS7 is used to establish a call, exchange user information, call routing, different billing structure, and supports Intelligent Network (IN) services. SS7 can also be used to identify operation parameters associated with the mobile device and/or the user.

The wireless communication provider 330 contacts (c) a registry manager 340 to determine whether the ADC is a registered ADC. The ADC is registered when the registry manager 340 determines that the ADC has not been registered. One or more registry servers 345 can process the ADC appropriately. For example, one of the registry servers 345 may access one or more databases (not shown) that store all registered ADCs. The registry manager 340 contacts (E) a provisioning manager 350 to obtain a campaign rule for the ADC. The provisioning manager 350 accesses a campaign rule database 354 to find the campaign rule associated with the ADC. As described above, a campaign rule sets out the protocol or process of routing the ADC to a predetermined destination (e.g., a regular telephone number, content, a service, a product, etc.)

The provisioning manager 350 can also generate new campaign rules or modify an existent campaign rule. When the campaign associated with the ADC is found, the provisioning manager forwards (F) the campaign rule to the registry manager 340. The registry manager instructs (D) the wireless service provider 330 on how and/or where to route the telephone call initiated by the user dialing the ADC, and the wireless service provider 330 routes the telephone signal (A) to the destination based on the campaign rule. For example, a SMS message (B) including a user selectable pointer (e.g., a hyperlink) to the desired content (e.g., a ringtone) can be sent to the mobile device.

In some variations, the operational parameters might include: different wireless carriers (Verizon, Cingular, etc), different transport technologies (CDMA, GMS, GPRS, EdVO, etc.), different mobile devices (Sony Ericsson, Samsung, Nokia, etc.), software execution platforms (Java, Brew, IDEN, MMS, etc.), and the like. The operational parameters may be determined, for example, by having a server associated with the service being provided poll the mobile communications device to determine or more of the parameters. Optionally, information, such as the wireless carrier and transport technology may be determined when the call is established.

The operational parameters may also be determined based on, for example, the telephone number of the mobile communications device. In some variations, a user may access a website or complete an off-line registration process with a service provider in which one or more of the operational parameters are provided. Thereafter, when a call is received from the mobile communications device, a database associated with a plurality of users may be polled using the telephone number in order to determine a proper format to route the telephone call to the desired destination according the campaign rule or set of rules. For instance, when content such as a ringtone is requested, the proper format of the data associated with the content is determined based on the operational parameters in order to convey the content to the mobile communications device. Alternatively, a user may also specify that in lieu of transmission to the mobile communications device, other delivery outlets for the data may be utilized such as an e-mail address or a postal address (which would entail sending brochure, CD, video, and the like to the user).

Figure 4:
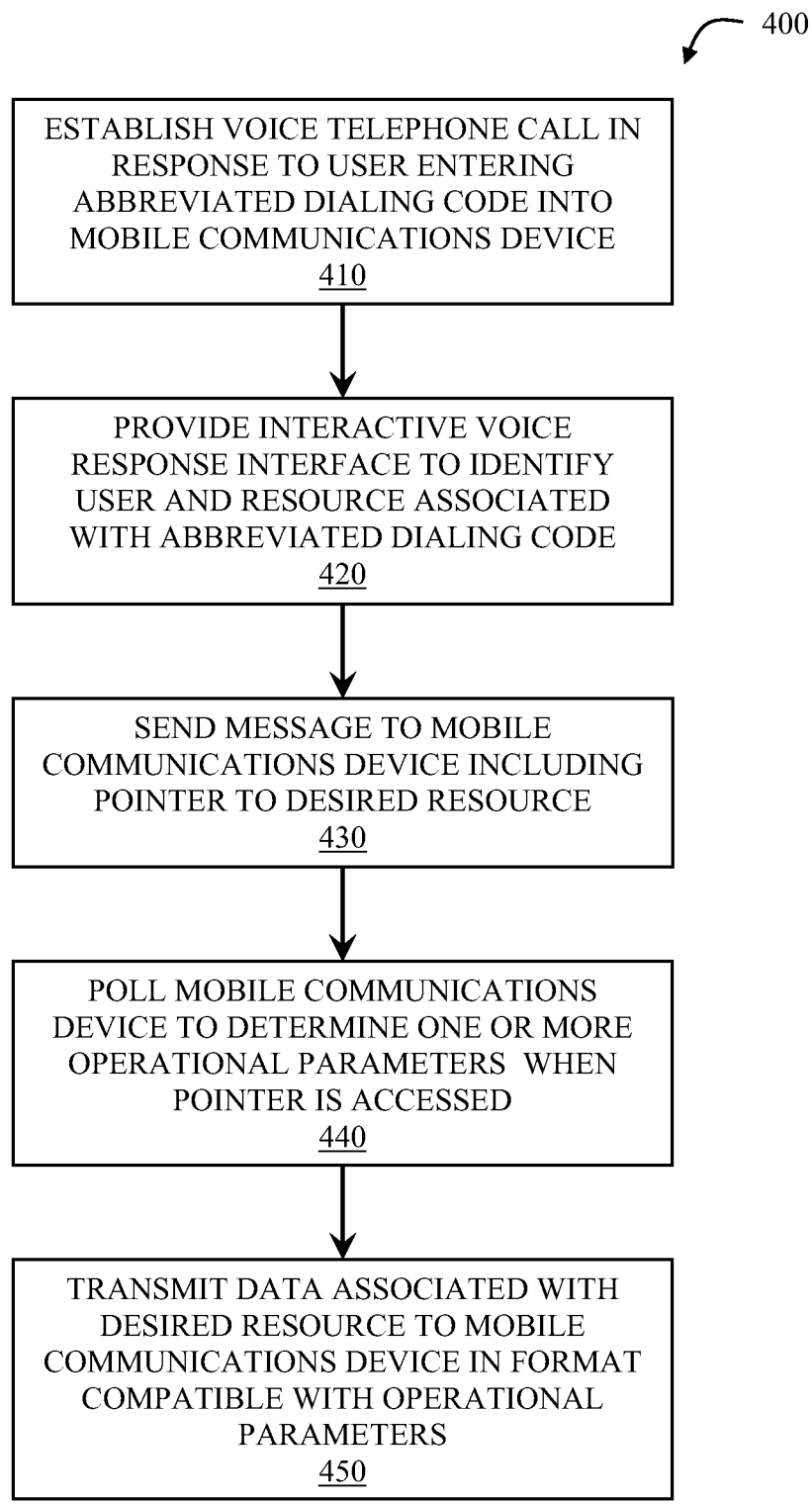
FIG. 4 is a process flow diagram illustrating a process for forwarding content to a mobile device in response to a telephone call initiated by dialing an abbreviated dialing code.

FIG. 4 illustrates a method 400, in which, at 410, a voice telephone call is established in response to a user entering an abbreviated dialing code into a mobile communications device. At 420, an interactive voice response interface is provided that allows for the identification of the user and a resource that is associated with the abbreviated dialing code. Thereafter, at 430, a message is sent to the mobile communications device including a pointer to a desired resource. The mobile communications device is polled (e.g., via a script), at 440, to determine one or more operational parameters associated with the device in response to an attempt to access the pointer. Subsequently, at 450, data associated with the desired resource is transmitted to the mobile communications device in a format compatible with the determined one or more operational parameters.

Figure 5:
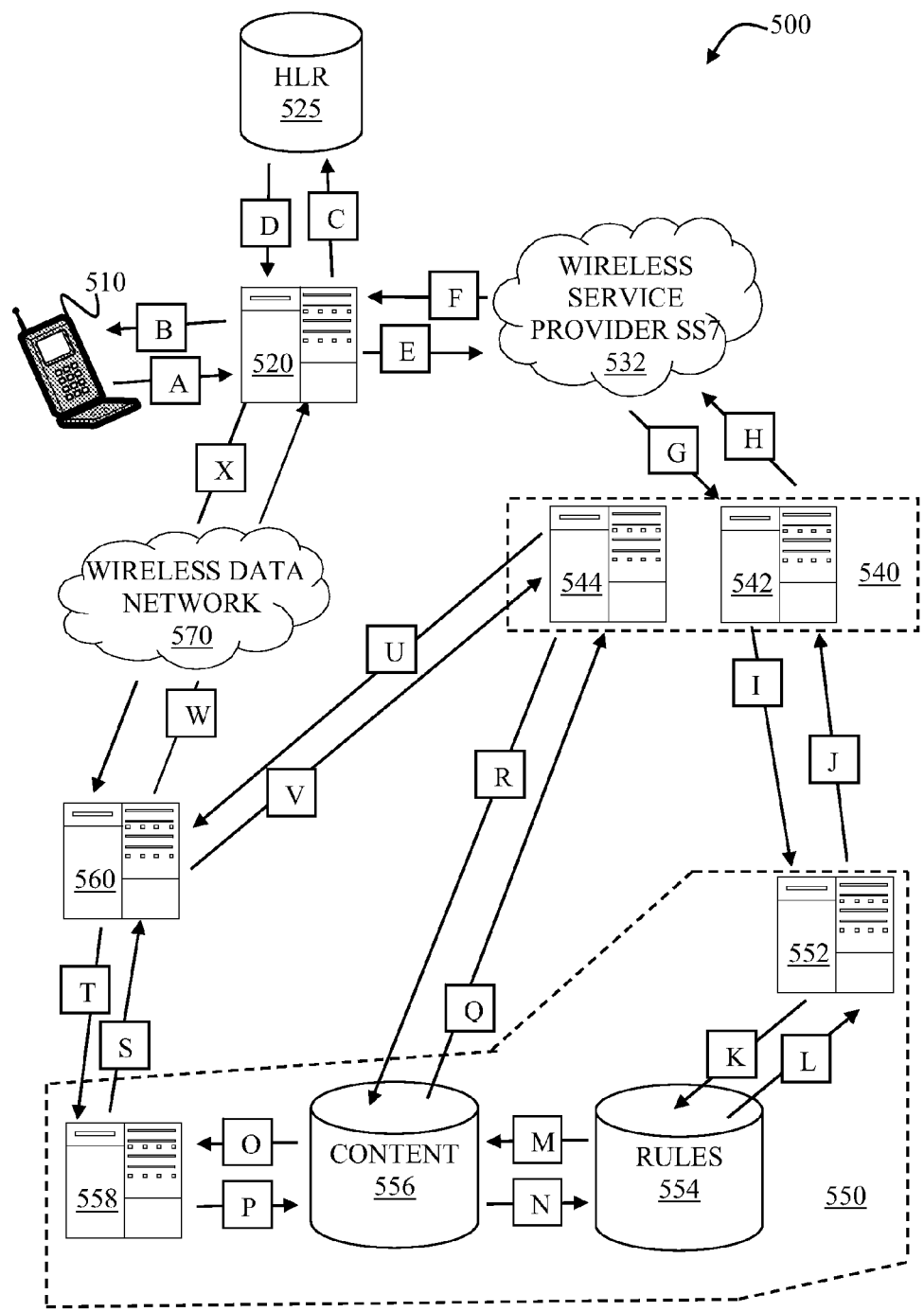
FIG. 5 is a functional block diagram illustrating a system for automatically provisioning an abbreviated dialing code in a wireless network.

FIG. 5 illustrates a block diagram 500 for automatically provisioning an ADC to a destination using SMS messages.

The system 500 includes a mobile device 510, through which a user can initiate a telephone call by dialing an ADC. The system also includes a mobile switching center (MSC), a Home Location Regulator (HLR) 525, an internal SS7 532 of the wireless service provider (not shown), a registry manager 540 (which includes one or more associated registry servers 542 and a SMS gateway 544), a provisioning manager 550 (which includes one or more provisioning servers 552, one or more rules databases 554, one or more content databases 556 and a SMS gateway 558) and a short message service center (SMSC) 560.

A SMSC is a network element in a mobile communication network that delivers a SMS message to a mobile device. When a user sends a text message (SMS message) to another user, the message gets stored in the SMSC which delivers the text message to the destination user when available. This is a store and forward operation. The SMSC usually has a configurable time limit for storing a message. Typically, the sending Mobile Station (MS) contacts the MSC which, in turn, locates SMSC of the destination user and the message gets stored in the SMSC of the destination user.

When a user initiates a telephone call by dialing an ADC on the mobile device 510, the telephone signal (A) is received by the MSC 520 to determine where to route the signal (A). An MSC is a telephone exchange that provides circuit-switched calling, mobility management, and wireless services (e.g., GSM services) to the mobile device 510 roaming within the area served by the MSC. An MSC can handles voice, data, fax and SMS messages in addition to diverting calls as necessary.

The MSC 520 contacts (C) the HLR 525 to obtain information (D) about the mobile device 510 and/or the user. For example, if the mobile device 510 is operating under GSM technology, the HLR 525 stores information about the Subscriber Identity Module (SIM) and Mobile Station Integrated Services Digital Network (MSISDN) of the mobile device 510. A SIM card stores network specific information used to authenticate and identify the subscriber (user) on the communication network. The information stored in the SIM card includes Integrated Circuit Card ID (ICCID) or SIM Serial Number (SSN), International Mobile Subscriber Identity (IMSI), Authentication Key (Ki), Local Area Identity (LAI). The SIM also stores other carrier specific data such as the SMSC (Short Message Service Centre) number, Service Provider Name (SPN), Service Dialling Numbers (SDN), and Value Added Service (VAS) applications.

The HLR 525 consists of a central database that stores the details of each mobile device subscriber that is authorized to use the core mobile communication network (e.g., a GSM network). At least one HLR is included in each Public Land Mobile Network (PLMN). In some implementations, the HLR 525 consists of multiple databases (e.g., when capacity of a single database is exceeded.) For a GSM network, the HLR 525 can store the necessary information for every SIM card issued by the mobile device operator (e.g., wireless service provider such as Verizon® Wireless.) For example, the IMSI is a unique number associated with each GSM and Universal Mobile Telecommunications System (UMTS) network mobile device user. The IMSI is sent by the mobile device 510 to the mobile communication network and can be used to acquire other details of the mobile device 510 stored in the HLR 525. In Code Division Multiple Acces (CDMA) and 1× Evolution-Data Optimized (EVDO) networks, the IMSI number is provisioned in the phone directly or in the Removable User Identity Module (RUIM) card (a CDMA analogue equivalent to a SIM card in GSM.)

The HLR 525 can store other information related to the mobile device 510 including (1) GSM or CDMA services that the subscriber has requested or been given; (2) GPRS settings to allow the subscriber to access packet service; (3) current location of the mobile device 510 (e.g., via Visitor Location Register (VLR), a database in a GSM network that stores information about all the mobiles within the jurisdiction of the MSC); and (4) call divert settings applicable for each associated MSISDN.

The MSC 520 forwards (E) the information received from the HLR 525 to the internal SS7 532 of the wireless service provider. The SS7 337 allows different elements of the system 500 to exchange information in form of messages to deliver the telephone call initiated when the user dialed the ADC across a communication network to the desired destination. In addition, SS7 is a set of telephony protocols that can identify operation parameters associated with the mobile device and/ or the user (e.g., information stored in the HLR 525) as describe above. In some instances, the location of the nearest radio transmission area (cell tower) that received and routed the telephone call from the mobile device 510 can be used to determine the location of the mobile device 510. A subscriber using the mobile device 510 register with a mobile network through the nearest radio transmission area (cell tower) and are registered at a VLR (not shown) that can serve various radio transmission areas. During the registration process, the HLR 525 is queried to validate the subscriber and the mobile device identity. The location of the subscriber and the mobile device is stored in the HLR 525.

The internal SS7 532 of the wireless service provider communicates (G, H) with a Wireless Intelligent Network (WIN)/ American Standards Institute (ANSI)-41/Mobile Application Part (MAP) application platform executing on a server such as the registry servers 542. ANSI-41 is a standard for identifying and authenticating subscribers (or users) and routing telephone calls on various mobile communication networks. The ANSI-41 standard is also used to identify the subscriber through the mobile device 510 and to route the telephone call initiated from the mobile device when the subscriber is roaming across different communication networks. ANSI-41 is used in Time Division Multiple Access (TDMA) or Code Division Multiple Access (CDMA) networks. For Global System for Mobility (GSM) networks, MAP protocols are used. ANSI-41 and MAP protocols are capable of utilizing SS7 532 (e.g., by riding on top of SS7 532) to manage roaming and other advanced communication functions. For example, ANSI-41 and MAP facilitate VLR to HLR communication by using SS7 signaling. WIN is a set of standards or protocols developed by Telecommunications Industry Association (TIA) that facilitate transportation of resources of an intelligent network to a wireless network, utilizing the interim standard IS-41. WIN standards allows changing to an intelligent network without making current network infrastructure obsolete.

Communication (G, H) between the internal SS7 and the registry server 542 may include forwarding information associated with the telephone call (e.g., information associated with the mobile device 510, the user, the ADC used to initiate the call, etc. stored in the HLR 525.) The registry server 542 communicates (I, J) with a provisioning server 552 of a provisioning manager 550 to obtain a campaign rule associated with the ADC used to initiate the telephone call. The provisioning server 552 communicates (K, L) with a campaign rules database 554 to search for and obtain a preexisting campaign rule (describes the destination for the ADC.) If no campaign rules exists, a new campaign rule may be generated.

In some implementations, content delivery is indicated in the campaign rule, and a content database 556 is accessed to obtain the desired content. For example, if the ADC is provisioned to a ringtone, the provisioned ringtone is obtained from the content database 556 and forwarded (O, Q) to a SMS gateway 558 and/or 544. The SMS gateway 558 is a part of the provisioning manager 550 and the SMS gateway 544 is a part of the registry manager 540. Either or both of the SMS gateways 544 and 558 can communicate (U, V, T, S) with the SMSC 560 to forward the ringtone to the mobile device 510 using SMS messages. The SMS messages forwarded (W) to the MSC 520, which sends (B) the SMS message to the mobile device.

In some implementations, the campaign rule obtained (L) from the campaign rules database 554 is used to instruct (J, H) the registry manager and/or the wireless service provider on releasing the telephone call (i.e., route the telephone call to a destination.) The WIN/ANSI-41/MAP application executing on the registry server 542 uses SS7 signaling (H, F) to forward the telephone call to the destination designated by the campaign rule.

In some implementations, the registry manager 540 verifies that the ADC is registered. When the registry manager determines that the ADC is not registered, the new ADC may be registered in order to facilitate management and control of the various ADCs.

Figure 6:
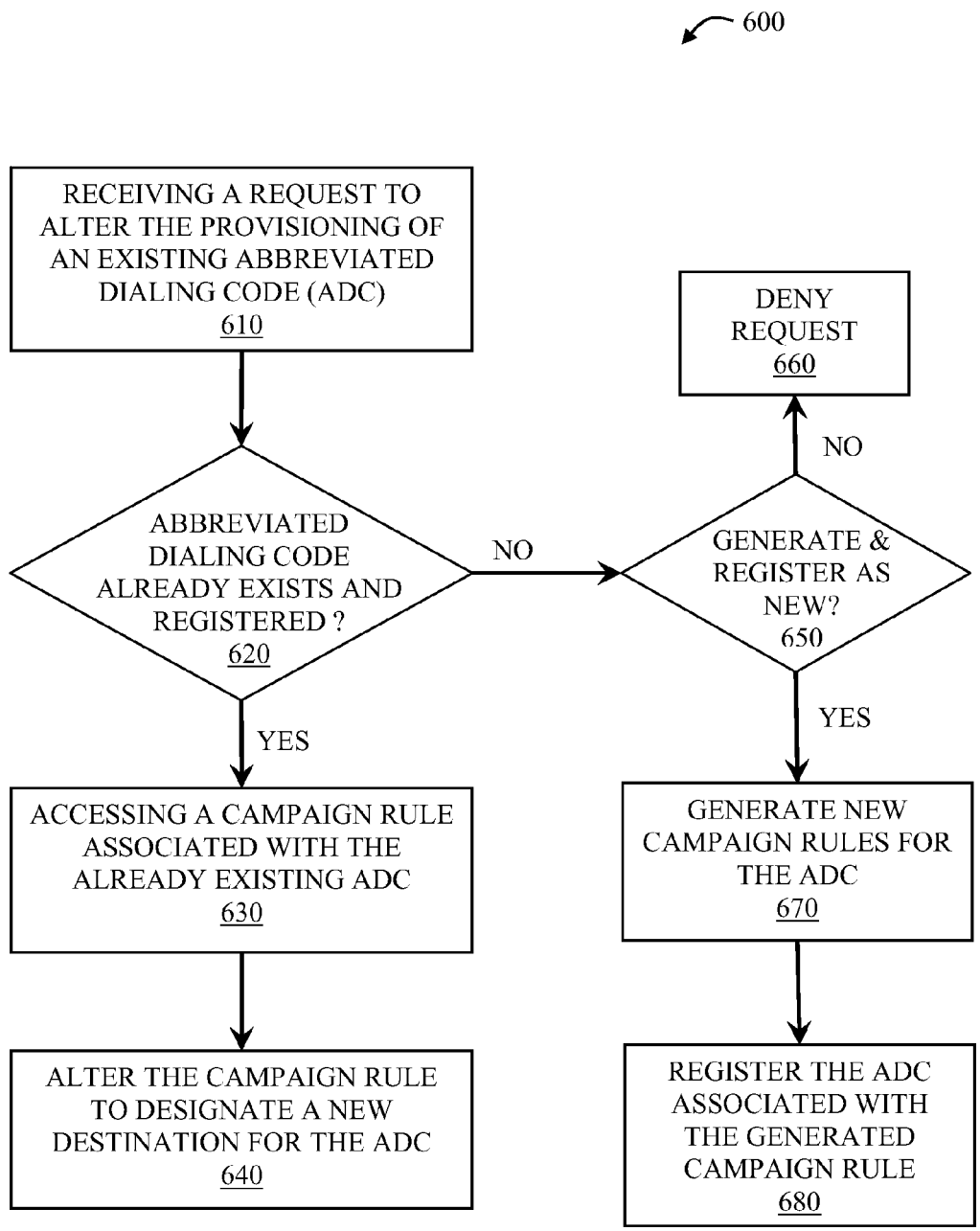
FIG. 6 is a process flow diagram illustrating a process for modifying a previously provisioned abbreviated dialing code.

FIG. 6 is a process flow diagram illustrating a process 600 for dynamically altering the provisioning of an existing ADC. At 610, a request to alter the provisioning of an existing abbreviated dialing code is received. For example, an ADC consisting of symbols and numbers, #CHEVY (#24389), is requested to be altered or reprovisioned to a new 800 telephone number. At 620, a determination is made whether the ADC, #CHEVY is an existing ADC. This may involve contacting a registry manager (e.g., 540) to request the registry manager to check against a list of registered ADCs. The registry manager 540, 340 or 220 may access a database (not shown) storing the registered ADCs. When the result of the determination at 620 is that the ADC already exists and is registered, one or more campaign rules (as described above) associated with the ADC is accessed at 630. For example, accessing the campaign rule may involve the provisioning manager 550, 350 or 210 accessing a database 354 or 554 or campaign rules. The accessed campaign rule is altered as requested at 640. In the #CHEVY example, the campaign rule may be altered to specify the destination as the newly request 800 telephone number.

Alternatively, when the result of the determination at 620 is that the ADC does not already exist, another determination is made, at 650, to decide whether to generate a new ADC (e.g., #CHEVY), as requested, and to register the newly generated ADC. This may involve sending a message to the source (not shown) of the request (e.g., a computer software module that processes requests for alteration in provisioning.) Alternatively, a default process may be present to automatically generate and provision a new ADC. When the decision at 650 is to generate a new ADC, one or more new campaign rules associated with the ADC are generated, at 670, according to the details of the request to alter the provisioning. The newly generated ADC associated with one or more campaign rules is registered at 680. Alternatively, when it is determined (e.g., either by a provisioning manager or a registry manager) that a new ADC should not to be generated at 650, the request received at 610 is denied at 660. For example, a message can be sent, automatically to the source of the request, stating that the request is denied because the ADC does not exist.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In particular, the provisioning manager 550, 350 and 210 can control all aspects of the process to automatically provision an ADC. In such instances, the registry manager merely forwards the instructions for routing a telephone call initiated by dialing the ADC. The registry manager can also manage registration of ADCs. Other embodiments may be within the scope of the following claims.

What is claimed is:

1. A method for automatically provisioning an abbreviated dialing code comprising:
   receiving a request to provision the abbreviated dialing code for use by a plurality of users;
   generating a campaign rule at a processor to automatically provision the abbreviated dialing code to a content delivery system, the campaign rule comprising at least one of a protocol and a process to direct one or more telephone calls from the plurality of users initiated with the abbreviated dialing code to the content delivery system;
   storing the campaign rule in a database by the processor;
   retrieving the campaign rule upon request by a communication network provider for an instruction to direct a telephone call initiated with the abbreviated dialing code to the content delivery system; and
   instructing the communication network provider to direct the telephone call according to the campaign rule.

2. The method of claim 1, further comprising generating the abbreviated dialing code to include a combination of one or more symbols and one or more numbers.

3. The method of claim 2, further comprising determining whether the abbreviated dialing code is registered and registering the abbreviated dialing code in a registered abbreviated dialing code database when the abbreviated dialing code is not registered.

4. The method of claim 2 wherein generating the abbreviated dialing code comprises generating a code beginning with a # or a * symbol.

5. The method of claim 1, wherein instructing the communication network provider to direct the telephone call is established through a wireless voice network.

6. The method of claim 1, wherein instructing the communication network provider to direct the telephone call is established through a wired voice network.

7. The method of claim 1, wherein instructing the communication network provider to direct the telephone call is established through a signaling system.

8. The method of claim 1, wherein the at least one of the protocol and the process consist of at least one of a telephone number, an interactive voice response system, an internet protocol address, and a short messaging system.

9. The method of claim 1, wherein the content delivery system delivers content comprising at least one of video data, a ringtone, a short messaging system message, and a hyperlink.

10. A method for automatically provisioning an abbreviated dialing code comprising:
    receiving a request to modify a previously provisioned abbreviated dialing code for use by a plurality of users;
    accessing a campaign rule associated with the abbreviated dialing code at a processor, the campaign rule comprising at least one of a protocol and a process to direct one or more telephone calls from the plurality of users initiated with the abbreviated dialing code to a content delivery system;
    modifying the campaign rule associated with the abbreviated dialing code to change the at least one of the protocol and the process to direct the one or more telephone calls initiated with the abbreviated dialing code;
    storing the modified campaign rule in a database by the processor;
    retrieving the campaign rule upon request by a communication network provider for an instruction to direct a telephone call initiated with the abbreviated dialing code to the content delivery system; and
    instructing the communication network provider to direct the telephone call initiated with the abbreviated dialing code according to the modified campaign rule.

11. The method of claim 10, wherein the modified campaign rule comprises a modified destination associated with the content delivery system.

12. A computer program product, encoded on a non-transitory computer-readable storage medium, operable to cause a data processing apparatus to perform operations to automatically provision an abbreviated dialing code comprising:
    receiving a request to provision the abbreviated dialing code for use by a plurality of users;
    generating a campaign rule to automatically provision the abbreviated dialing code to a content delivery system, the campaign rule comprising at least one of a protocol and a process to direct one or more telephone calls from the plurality of users initiated with the abbreviated dialing code to the content delivery system;
    storing the campaign rule in a database;
    retrieving the campaign rule upon request by a communication network provider for an instruction to direct a telephone call initiated with the abbreviated dialing code to the content delivery system; and
    instructing the communication network provider to direct the telephone call initiated by dialing the abbreviated dialing code according to the campaign rule.

13. The computer program product of claim 12, further operable to cause a data processing apparatus to perform operations comprising generating the abbreviated dialing code to include a combination of one or more symbols and one or more numbers.

14. The computer program product of claim 13, further operable to cause a data processing apparatus to perform operations comprising registering the abbreviated dialing code.

15. The computer program product of claim 13, wherein causing the data processing apparatus to generate the abbreviated dialing code comprises generating a code beginning with a # or a * symbol.

16. A computer program product of claim 12, wherein causing the data processing apparatus to instruct the communication network provider is established through a wireless voice network.

17. A computer program product of claim 12, wherein causing the data processing apparatus to instruct the communication network provider is established through a wired voice network.

18. A computer program product of claim 12, wherein causing the data processing apparatus to instruct the communication network provider is established through a signaling system.

19. A computer program product of claim 12, wherein the at least one of the protocol and the process consist of at least one of a telephone number, an interactive voice response system, an internet protocol address, and a short messaging system.

20. The computer program product of claim 12, wherein the content delivery system delivers content comprising at least one of video data, a ringtone, a short messaging system message, and a hyperlink.

21. A computer program product, encoded on a non-transitory computer-readable storage medium, operable to cause a data processing apparatus to perform operations to automatically provision an abbreviated dialing code comprising:

receiving a request to modify a previously provisioned abbreviated dialing code for use by a plurality of users;

accessing a campaign rule associated with the abbreviated dialing code from a database, the campaign rule comprising at least one of a protocol and a process to direct one or more telephone calls from the plurality of users initiated with the abbreviated dialing code to a content delivery system;

modifying the campaign rule associated with the abbreviated dialing code to change the at least one of the protocol and the process to direct the one or more telephone calls initiated with the abbreviated dialing code;

storing the modified campaign rule in the database;

retrieving the campaign rule upon request by a communication network provider for an instruction to direct a telephone call initiated with the abbreviated dialing code to the content delivery system; and instructing the communication network provider to direct the telephone call initiated with the abbreviated dialing code according to the modified campaign rule.

22. A computer program product of claim 21, wherein the modified campaign rule comprises a modified destination associated with the content delivery system.

23. A system to automatically provision an abbreviated dialing code comprising:

a database; and a provisioning server to process a request to provision the abbreviated dialing code for use by a plurality of users, generate at least one campaign rule comprising at least one of a protocol and a process to direct one or more telephone calls from the plurality of users initiated with the abbreviated dialing code to a content delivery system, store the campaign rule in the database, retrieve the campaign rule upon request by a communication network provider for an instruction to direct a telephone call initiated with the abbreviated dialing code to the content delivery system, and instruct the communication network provider to direct the telephone call according to the campaign rule.

24. The system of claim 23, wherein the provisioning server generates the abbreviated dialing code to include a combination of one or more symbols and one or more numbers.

25. The system of claim 23, further comprising a registry manager communicatively coupled to the provisioning server to determine whether an abbreviated dialing code is registered and to register the abbreviated dialing code in a registered abbreviated dialing code database when the abbreviated dialing code is not registered.

26. The system of claim 23, wherein the provisioning server generates the abbreviated dialing code to include a code beginning with a # or a * symbol.

27. The system of claim 23, wherein the telephone call is initiated by a mobile communication device, and the provisioning server instructs the communication network provider to direct the telephone call initiated by the mobile communication device to the content delivery system based on the at least one campaign rule.

28. The system of claim 23, wherein the provisioning server instructs the communication network provider over a wireless voice network.

29. The system of claim 23, wherein the provisioning server instructs the communication network provider over a wired voice network.

30. The system of claim 27, wherein the content delivery system delivers a telephone number.

31. The system of claim 27, wherein the content delivery system delivers an internet protocol address.

32. The system of claim 27, wherein the content delivery system delivers content to the mobile communication device.

33. The system of claim 32, wherein the content comprises video data.

34. The system of claim 32, wherein the content comprises a ringtone.

35. The system of claim 32, wherein the content comprises a service.

36. The system of claim 23, wherein instructing the communication network provider to direct the telephone call is established through a signaling system.

37. The system of claim 23, wherein the at least one of the protocol and the process consist of at least one of a telephone number, an interactive voice response system, an internet protocol address, and a short messaging system.

38. The system of claim 23, wherein the content delivery system delivers content comprising at least one of video data, a ringtone, a short messaging system message, and a hyperlink.

39. A system to automatically provision an abbreviated dialing code comprising:

a database comprising at least one campaign rule comprising at least one of a protocol and a process to direct one or more telephone calls initiated with the abbreviated dialing code to a content delivery system; and a provisioning server to receive a request to modify a previously provisioned abbreviated dialing code for use by a plurality of users, access the at least one campaign rule, modify at least one of the protocol and the process to direct the one or more telephone calls from the plurality of users initiated with the abbreviated dialing code, store the modified campaign rule in the database, retrieve the modified campaign rule upon request by a communication network provider for an instruction to direct a telephone call initiated with the abbreviated dialing code to the content delivery system, and instruct the communication network provider to direct the telephone call according to the modified campaign rule.

40. The system of claim 39, further comprising a registry manager to determine whether the abbreviated dialing code is registered and transmit the request to the provisioning server when the abbreviated dialing code is registered.

* * * * *